Nov. 1, 1960  J. M. STRANG ET AL  2,958,256
INSTRUMENTS FOR OBSERVING MOVING PATTERNS
Filed Nov. 12, 1958
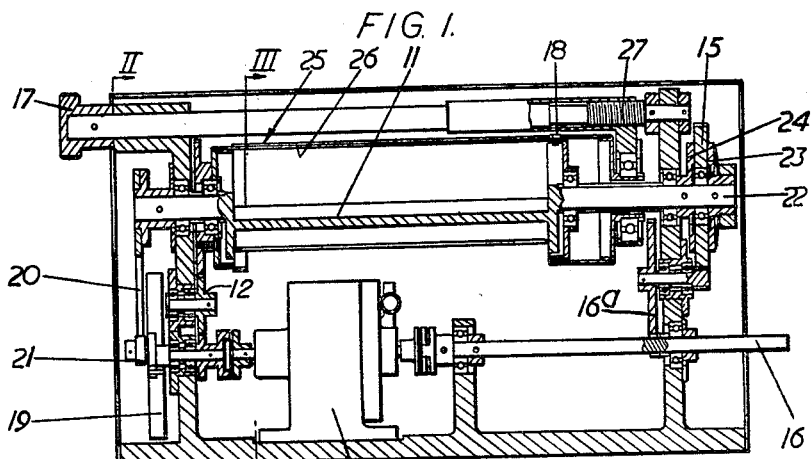
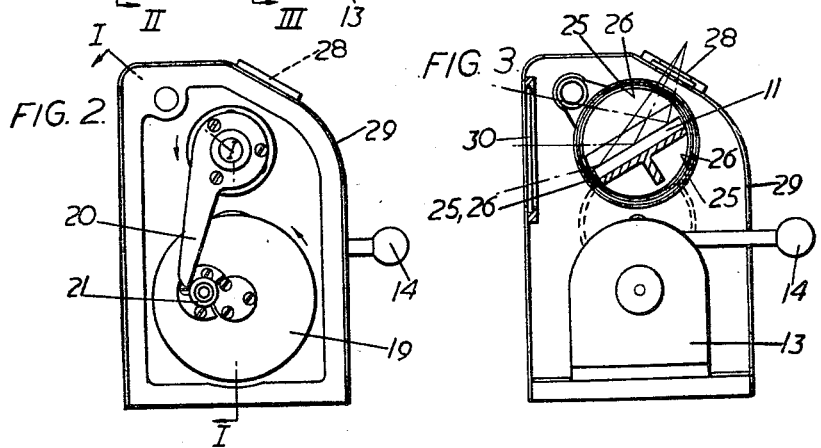
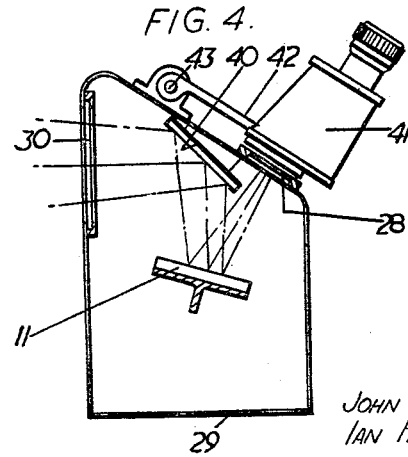
Inventors
JOHN MARTIN STRANG and
IAN HUGH MACKENZIE
By Mason, Fenwick & Lawrence
Attorneys

2,958,256

INSTRUMENTS FOR OBSERVING MOVING PATTERNS

John Martin Strang, Bearsden, and Ian Hugh Mackenzie, Glasgow, Scotland, assignors to Barr and Stroud Limited, Anniesland, Glasgow, Scotland, a British company Filed Nov. 12, 1958, Ser. No. 773,317

Claims priority, application Great Britain Feb. 8, 1958

5 Claims. (Cl. 88—14)

This invention relates to instruments for observing objects or patterns moving too rapidly to be viewed clearly by the naked eye and recurring at regular intervals, and may be applied to instruments for observing the surfaces of moving webs, especially of paper or cloth having repeat patterns of printing thereon, and is particularly applicable for use with rotary printing presses where it is desired to examine the print output on a rapidly moving web. Hereinafter the invention will be described with reference to observation of repeat patterns on moving webs, and this term is intended hereinafter to embrace recurrent objects.

Hitherto trained operators have in some cases been able to observe patterns or prints on a moving web by moving the head in synchronism with the web. However, with current high speed machines this practice has become unreliable if not impossible. Observation by stroboscopic lamp may also be unreliable, as the speed of rotary printing machines, while high, may not be high enough to enable the persistence of vision to allow a steady image to be seen.

It is an object of the present invention to provide a simple instrument to enable observation of moving webs having repeat patterns thereon and which may move at speeds over a wide range, thus obviating or mitigating the above disadvantages.

In accordance with the present invention there is provided an instrument for observing the surfaces of moving webs, especially of repeat patterns, comprising mirror means in which the pattern can be viewed, means for repeatedly turning said mirror means about an axis transverse to the web from a starting position in synchronism with the web movement, and means for quickly returning the mirror means to its starting position between said turning movements so that it restarts its turning movements at controlled intervals whereby the repeat patterns are viewed successively in the same position.

Preferably means are provided for varying the interval between successive restarts of the mirror means to enable it repeatedly to pick up different lengths of repeat pattern.

Preferably said means for returning the mirror means to its starting position comprises an intermittently acting striker, and an element associated with said mirror means said element being intermittently returned by said striker.

Preferably the mirror means is continuously rotated relative to said striker through friction or other slip gearing which permits the returning movement of the mirror means.

Moreover preferably means are provided for varying the frequency of operation of said striker in order to vary the intervals between successive restarts.

Preferably the means for turning said mirror means is coupled to the web moving means, so that the mirror turns in synchronism with the web movement.

Furthermore, the invention may comprise shutter means to mask the mirror means while returning to its starting position.

An embodiment of the invention will now be described by way of example with reference to an instrument suitable for viewing the printed web emerging from a rotary printing press, with reference to the accompanying drawings in which:

Fig. 1 is a sectional elevation on the line I—I—I on Fig. 2;

Fig. 2 is a sectional elevation on the line II—II of Fig. 1;

Fig. 3 is a sectional elevation on the line III—III of Fig. 1; and

Fig. 4 is a diagrammatic sectional elevation illustrating a modification.

The instrument is constructed as a unit for driving connection to a printing press, and is normally located above or in front of the moving web.

The drive to the unit is through an input shaft 16 connected to a rotating element in the printing press through gearing.

Shaft 16 is connected to a spindle 22 carrying a strip mirror 11 through a system of gears 16a and a friction drive, the latter being obtained by a friction wheel 15, driven by shaft 16 and sandwiched between two discs 23 and 24 on spindle 22. Thus as the input shaft 16 rotates, the mirror 11 also rotates as long as there is no restriction greater than the torque available through the friction input. At the opposite end of the mirror spindle 22 and rigidly connected to it is a radius arm 20 which turns in unison with mirror 11.

Beneath spindle 22 is a variable speed mechanism 13 also driven by shaft 16. The output from the variable speed mechanism drives a flywheel 19 having a striker 21 eccentrically affixed thereto. Said radius arm 20 is acted on by this striker whereby mirror 11 is returned to its starting position once for every revolution of the flywheel 19. The output speed from the variable speed mechanism 13 is adjusted by means of a control knob 14. While many conventional speed changing mechanisms which would be suitable for the variable speed mechanism 13 are known and commercially available, one known speed changing mechanism which has been found satisfactory for the variable speed mechanism 13 is disclosed in U.S. Patent No. 2,469,653, issued May 10, 1949, to J. Kopp.

In operation the mirror 11 turns and follows the pattern on the web as the latter travels, until the striker rotating on the flywheel 19 makes contact with the arm 20. Further rotation of the flywheel 19 causes the arm 20, and so also the mirror 11, to turn in the reverse direction against the friction drive, until the striker clears the end of the arm, and so allows the mirror to restart its original turning or oscillating movement.

The starting position of the mirror 11 for each successive rotation is clearly the same. The frequency of return to the starting position is adjusted by varying the speed of flywheel 19 by adjustment of the variable speed mechanism 13 as above until the frequency agrees with that with which successive patterns are being presented. In this way the interval between successive restarts is varied to enable the mirror repeatedly to pick up different lengths of repeat pattern. By this means the position of the pattern, seen during each successive rotation of the mirror, will appear to the observer to be the same.

During the time that the mirror 11 is being returned to its starting position a completely blurred image of the web would be seen by an observer viewing the mirror, and this would cause loss of clarity and might be objectionable. To overcome this difficulty a shutter 25, 26 is used to shut off the view so that the observer does not see the reflection of the web during the time that the mirror is returning to its starting position. This shutter consists of two concentric cylinders 25, 26 with appropriate ports cut in them, the cylinders being driven together through gearing 12 by the output from the variable speed mechanism 13. Thus the rotational speed of the shutter bears a fixed relationship to the rotational speed of the flywheel 19 and striker 21, and thus to the frequency of mirror return to the starting position.

A helical groove is cut in the outside cylinder 25 of the shutter, and a pin is attached through this groove to the inside cylinder 26. Thus axial movement imparted to the outer cylinder 25 will cause the inner cylinder 26 to be angularly adjusted relative to it. This arrangement, by changing the overlap between the ports of cylinders 25, 26 enables the resultant circumferential size of the shutter ports to be varied by means of the operating shaft and knob 17, the former varying the axial position of the outer cylinder 25 through feed screw 27. This can be done even while the machine is running, as cylinder 25 is freely slidable along spindle 22.

A casing 29 is provided to surround and protect the unit, and a viewing aperture 28 is provided through which the mirror 11 is viewed by the observer at X. A further aperture 30 is provided to enable the mirror to scan the moving web.

The mirror 11 will present the image of the web to an observer through window 28 in an inverted attitude; and hence a second but normally stationary mirror may be provided. This second mirror may be mounted either before or after the rotating mirror, and presents the image in the correct attitude.

Moreover, a lens system, for example a binocular, may be incorporated at the viewing point to present a magnified image of the travelling pattern to the observer; this lens system may be self-contained and means may be provided for detachably mounting it on the instrument.

Fig. 4 shows the casing 29, apertures 28 and 30, and oscillating mirror 11, as in Fig. 3, but a second stationary mirror 40 is mounted as shown and inverts the incoming light beam, so that the observer views the image in the true attitude. This figure also illustrates at 41 a binocular positioned at viewing aperture 28 and pivotal as required to an inoperative position by an arm 42 pivoted at 43.

No special lighting requires to be provided as the light loss in the instrument is negligible. Both the colour and size of the pattern appear normal.

The viewer can be arranged to deal with a very wide range of operating conditions, depending on the distance chosen for the separation between the viewer and the web. As the distance increases the width of web seen increases, as also does the repeat length measured along the web.

In many cases the drive from the web moving machine to the viewer can be conveniently arranged by direct mechanical means. For those cases where such a drive cannot be provided, the viewer can be supplied with that known as "synchronous link" transmission.

This consists of two small electric synchronous machines, i.e. driver and follower. The driver is connected to one of the rotating shafts of the web moving machine through a suitable gear ratio, while the follower is connected to the viewer through a reduction gear. The driver and follower are connected to each other by electric wires only, thus avoiding the need for running mechanical drives through difficult routes.

We claim:

1. An instrument for observing the surfaces of moving webs, especially of repeat patterns, comprising mirror means in which the pattern can be viewed, an input shaft driven in synchronism with the web movement, means driven from said input shaft for repeatedly turning said mirror means about an axis transverse to the direction of web movement from a starting position in an advancing direction corresponding to the direction of web movement and at a constant speed relationship to the input shaft speed, returning means for quickly returning the mirror means in a reverse direction to its starting position between said turning movements so that it restarts its turning movements at controlled intervals, and adjusting means driven from said input shaft having an output drive of selected variable speed relative to the input shaft speed for cyclically actuating said returning means and varying the frequency of operation of said returning means.

2. An instrument as claimed in claim 1, wherein said returning means comprises an arm intercoupled with said mirror means for imparting return movement to the latter during movement of said arm through a return stroke, and an intermittently acting striker driven by said output drive of said adjusting means to contact said arm and move the same through said return stroke.

3. An instrument as claimed in claim 2, wherein said mirror means includes slip drive means for continuously urging the mirror means to rotate in said advancing direction about the axis of rotation of the mirror means and relative to said striker, said slip drive means having a predetermined slippage relative to the force of said striker to permit returning movement of the mirror means responsive to said striker.

4. An instrument for observing the surfaces of moving webs, especially of repeat patterns, comprising a mirror supported for rotation about an axis transverse to the direction of web movement in which an image of the pattern can be viewed, an input shaft driven in synchronism with the web movement, slip drive means intercoupling said mirror with said input shaft for continuously urging the mirror to rotate from a starting position in an advancing direction corresponding to the direction of web movement at a constant speed relationship to the input shaft speed, returning means for imparting return movement to said mirror including an arm intercoupled with the mirror and a rotatable member having an eccentrically mounted striker thereon adapted to contact said arm and move the same through a return stroke to return the mirror in a reverse direction to its starting position, and adjusting means driven from said input shaft having an output drive of selected variable speed relative to the input shaft speed for cyclically actuating said adjusting means and varying the frequency of operation of said striker and arm to return the mirror to starting position whereby the frequency of return of the mirror will be dependent upon the variable output speed of said adjusting means.

5. An instrument as claimed in claim 1, including rotatable shutter means for masking the mirror means while the latter is returning to its starting position, and means intercoupling said shutter means with the output drive of said adjusting means for varying the frequency of operation of said shutter means in selected relationship to variation of the frequency of operation of said returning means.

References Cited in the file of this patent

UNITED STATES PATENTS

| | | |
|---|---|---|
| 2,022,487 | Boaz | Nov. 26, 1935 |
| 2,124,802 | Wallace | July 26, 1938 |
| 2,214,500 | Fischer | Sept. 10, 1940 |
| 2,557,219 | Flint et al. | June 19, 1951 |
| 2,626,535 | Owen et al. | Jan. 27, 1953 |

FOREIGN PATENTS

| | | |
|---|---|---|
| 453,985 | Great Britain | Sept. 22, 1936 |